US007912720B1

(12) United States Patent
Hakkani-Tur et al.

(10) Patent No.: US 7,912,720 B1
(45) Date of Patent: Mar. 22, 2011

(54) SYSTEM AND METHOD FOR BUILDING EMOTIONAL MACHINES

(75) Inventors: Dilek Z. Hakkani-Tur, Denville, NJ (US); Jackson J. Liscombe, New York, NY (US); Guiseppe Riccardi, Hoboken, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 638 days.

(21) Appl. No.: 11/185,092

(22) Filed: Jul. 20, 2005

(51) Int. Cl.
*G10L 21/00* (2006.01)
*G10L 15/00* (2006.01)
*G10L 15/18* (2006.01)
*G06F 17/20* (2006.01)
*G06F 17/27* (2006.01)

(52) U.S. Cl. ............... 704/270; 704/1; 704/9; 704/238; 704/239; 704/240; 704/257; 704/270.1; 704/275

(58) Field of Classification Search .............. 704/257, 704/255, 251, 231, 1, 9, 238, 239, 240, 270, 704/270.1, 275
See application file for complete search history.

(56) References Cited

U.S. PATENT DOCUMENTS

| | | | | |
|---|---|---|---|---|
| 5,860,064 A * | 1/1999 | Henton | .......................... | 704/260 |
| 5,918,222 A * | 6/1999 | Fukui et al. | ........................... | 1/1 |
| 5,987,415 A * | 11/1999 | Breese et al. | .................. | 704/270 |
| 6,151,571 A * | 11/2000 | Pertrushin | ..................... | 704/209 |
| 6,173,266 B1 * | 1/2001 | Marx et al. | ..................... | 704/270 |
| 6,665,644 B1 * | 12/2003 | Kanevsky et al. | ............ | 704/275 |
| 6,721,704 B1 * | 4/2004 | Strubbe et al. | ................ | 704/270 |
| 6,721,706 B1 * | 4/2004 | Strubbe et al. | ................ | 704/275 |
| 6,876,728 B2 * | 4/2005 | Kredo et al. | ............... | 379/88.17 |
| 7,197,132 B2 * | 3/2007 | Dezonno et al. | ......... | 379/265.07 |
| 7,289,949 B2 * | 10/2007 | Warner et al. | ..................... | 704/9 |
| 7,298,256 B2 * | 11/2007 | Sato et al. | ................ | 340/539.11 |
| 7,451,079 B2 * | 11/2008 | Oudeyer | ........................ | 704/205 |
| 7,664,627 B2 * | 2/2010 | Mitsuyoshi | ........................ | 704/1 |
| 7,684,984 B2 * | 3/2010 | Kemp | ........................... | 704/235 |
| 2002/0095295 A1 * | 7/2002 | Cohen et al. | .................. | 704/275 |
| 2003/0033145 A1 * | 2/2003 | Petrushin | ..................... | 704/236 |
| 2003/0154076 A1 * | 8/2003 | Kemp | ........................... | 704/236 |
| 2003/0182122 A1 * | 9/2003 | Horinaka et al. | .............. | 704/270 |
| 2003/0182123 A1 * | 9/2003 | Mitsuyoshi | ................... | 704/270 |
| 2006/0122834 A1 * | 6/2006 | Bennett | ......................... | 704/256 |

OTHER PUBLICATIONS

Chul Min Lee, et al. "Toward Detecting Emotions in Spoken Dialogs", IEEE Transactions on Speech and Audio Processing, vol. 13, No. 2, Mar. 2005, pp. 293-303.*
Elizabeth Shriberg, Andreas Stolcke, "Direct Modeling of Prosody: An Overview of Applications in Automatic Speech Processing", Proc. International Conference on Speech Prosody; Mar. 2004.*
Chul Min Lee, S.S. Narayan, "Toward detecting emotions in spoken dialogs", IEEE, Mar. 2005.*
Jeremy Ang, et al. "Prosody-Based Automatic Detection of Annoyance and Frustration in Human-Computer Dialog", International Computer Science Institute, Berkeley CA., Speech Technology and Research Laboratory, SRI International, Menlo Park, CA, and University of California, Berkeley, CA., 2002.
A. Batliner, et al. "How to Find Trouble in Communication", *Speech Communication*, 40:117-143, 2003, pp. 1-32.

* cited by examiner

Primary Examiner — Eric Yen

(57) ABSTRACT

A system, method and computer-readable medium for practicing a method of emotion detection during a natural language dialog between a human and a computing device are disclosed. The method includes receiving an utterance from a user in a natural language dialog between a human and a computing device, receiving contextual information regarding the natural language dialog which is related to changes of emotion over time in the dialog, and detecting an emotion of the user based on the received contextual information. Examples of contextual information include, for example, differential statistics, joint statistics and distance statistics.

20 Claims, 2 Drawing Sheets

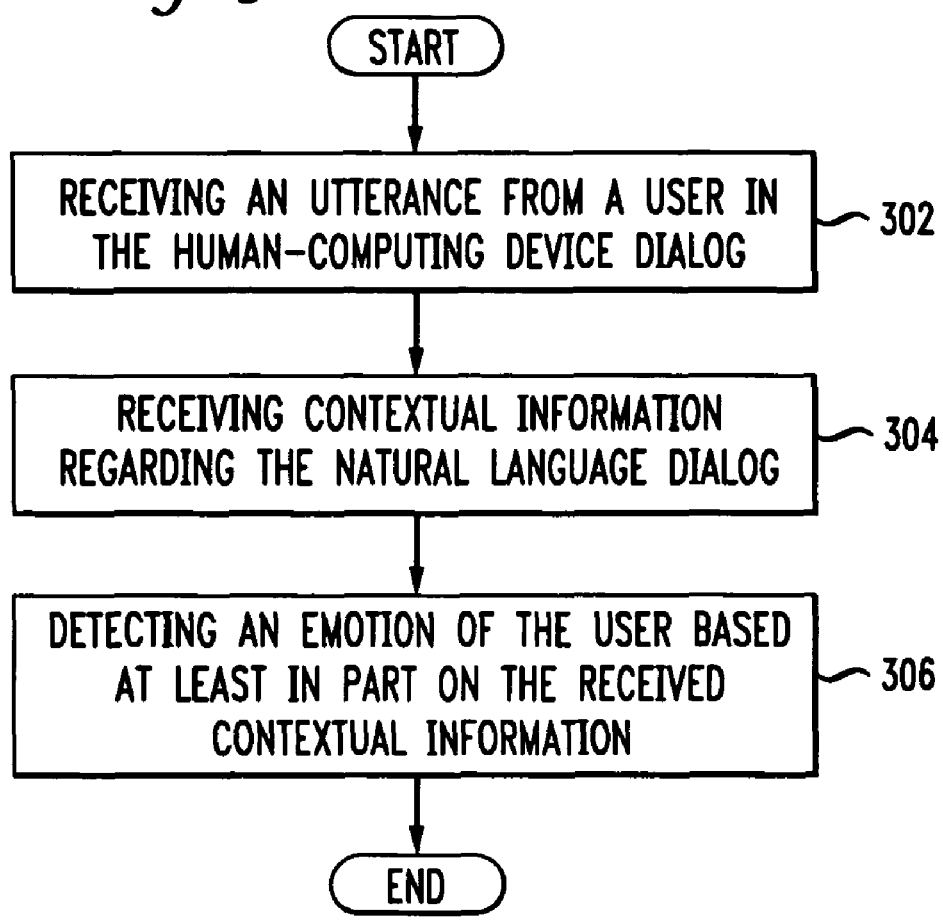

SYSTEM AND METHOD FOR BUILDING EMOTIONAL MACHINES

BACKGROUND OF THE INVENTION

1. Field of the Invention

The present invention relates to a system and method of providing a more natural interaction between a human and a computing device by providing an improved method of detecting emotion.

2. Introduction

Some studies have been performed on the topic of understanding the affective component of human-machine communication. The affective component relates to understanding the emotion in speech. In normal conversation, people gather much information not just from the actual words spoken but also from how they are spoken. We learn from pitch, volume, intensity and so forth about the meaning of the words spoken by an individual.

In state-of-the-art spoken dialog systems, the dimension related to emotion is usually ignored though it plays a major role in engaging users in communicating with machines. Speech researchers are becoming increasingly interested in human emotion. There is an ever growing body of research pointing to useful indicators of emotional speech; most specifically, prosodic (pitch, energy, speaking rate) and lexical features. However, most of this research has used data elicited from actors. Notwithstanding, a few researchers have begun to look at emotions as they develop and evolve in more natural settings in spoken dialog systems. Currently, there are three open research issues in emotion processing.

Regarding emotion annotation, studies show that although researchers have created protocols for various degrees of emotion states, their distributions are very skewed and, more importantly, inter-labeler agreement is relatively low. In the area of emotion prediction, studies show that given the nature of the problem, there is not a dominant predictive feature and the studies present the use of very large feature sets that exhibit low correlations. Thus, researchers tend to reduce the problem to a binary decision (negative vs. positive state). Such a binary decision does not provide the depth of information necessary to improve the spoken dialog. Finally, a computational model of affective computing has been studied and should be able to predict the user's current state and act upon it. The action should move the user to the next internal state of the dialog which is most likely to lead to a successful dialog in terms of the dialog goal and the user (positive) state.

What is needed in the art is an improved system and method of improving a spoken dialog system according to user emotion.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the deficiencies in the prior art. In human-machine communication, a typical computing device can neither express feelings nor understand them. More importantly, a typical computing device cannot take actions upon emotions. The emotional channel is the untapped source of information to engage users in efficient and effective interactions. The present invention improves upon emotion prediction by grounding prosodic, lexical and discourse features within a spoken dialog using contextual and dynamic features. Multivariate statistics from the dialog history (trace) are used to calculate features that are user-dependent and thus overcome the data sparseness and labeling problems. Another aspect of the invention relates to data generation. The spoken dialog corpora collected is spontaneous in contrast to acted or emotion-elicited corpora that have most often been used in research.

The invention provides for a system, method and computer readable medium storing instructions related to emotions in a spoken dialog system. The method embodiment of the invention is a method for emotion detection during a natural language dialog between a human and a computing device. The method comprises receiving an utterance from a user in a natural language dialog, receiving contextual information regarding the natural language dialog and detecting an emotion of the user based at least in part on the received contextual information.

The invention includes an aspect related to predicting human emotions in human-machine conversations and thus enables a more natural flow of dialogs. Emotions or paralinguistic information is helpful in determining, among other things, a customer's state which could be used to elicit correct information and provide friendly user experience.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a method embodiment of the invention.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
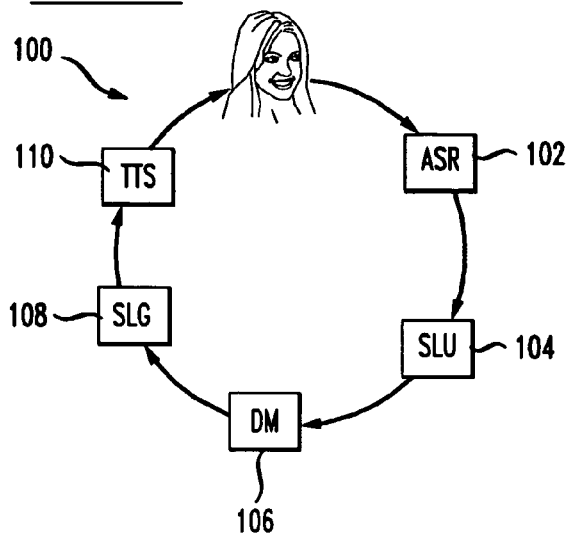
FIG. 1 illustrates a spoken dialog system.

Spoken dialog systems aim to identify human intent expressed in natural language, take actions accordingly and to satisfy their requests. FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108 and a text-to-speech (TTS) module 110.

ASR module 102 may analyze speech input and may provide a transcription of the speech input as output. SLU module 104 may receive the transcribed input and may use a natural language understanding model to analyze the group of words that are included in the transcribed input to derive a meaning from the input. The role of DM module 106 is to interact in a natural way and help the user to achieve the task that the system is designed to support. DM module 106 may receive the meaning of the speech input from SLU module 104 and may determine an action, such as, for example, providing a response, based on the input. SLG module 108 may generate a transcription of one or more words in response to the action provided by DM 106. TTS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone or communication capability) may have an ASR module wherein a user may say "call mom" and the smartphone may act on the instruction without a "spoken dialog."

The invention is related to a computing device and how a user interacts with the device. The following discussion is intended to provide a brief, general description of a suitable computing environment in which the invention may be implemented. Although not required, the invention will be described, at least in part, in the general context of computer-executable instructions, such as program modules, being executed by a computing device such as a desktop or laptop computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Several aspects of the invention make it unique. One aspect of the invention involves predicting the user's state from pre-labeled data as well as from a just-in-time computation of what the user state is. It revolutionizes the state-of-the-art of human-machine communication by opening a paralinguistic channel between the human and the machine. The problem is difficult because the user state is not stable across user population and is in general a relative concept within a social and/or ethnic and/or geographical group. Therefore, the inventors consider an aspect of their invention to identify through means such as accent, other user input, or from the dialog itself, one of a social and/or ethnic and/or geographical group that has separate identifiable concepts of emotion. If the computing device that is operating under the principles of the invention therefore identifies the appropriate group, it can apply algorithms for that group to further enhance the user experience. Other means of identifying the appropriate group and making the appropriate modifications and adjustments to the computing device are also contemplated.

Figure 2:
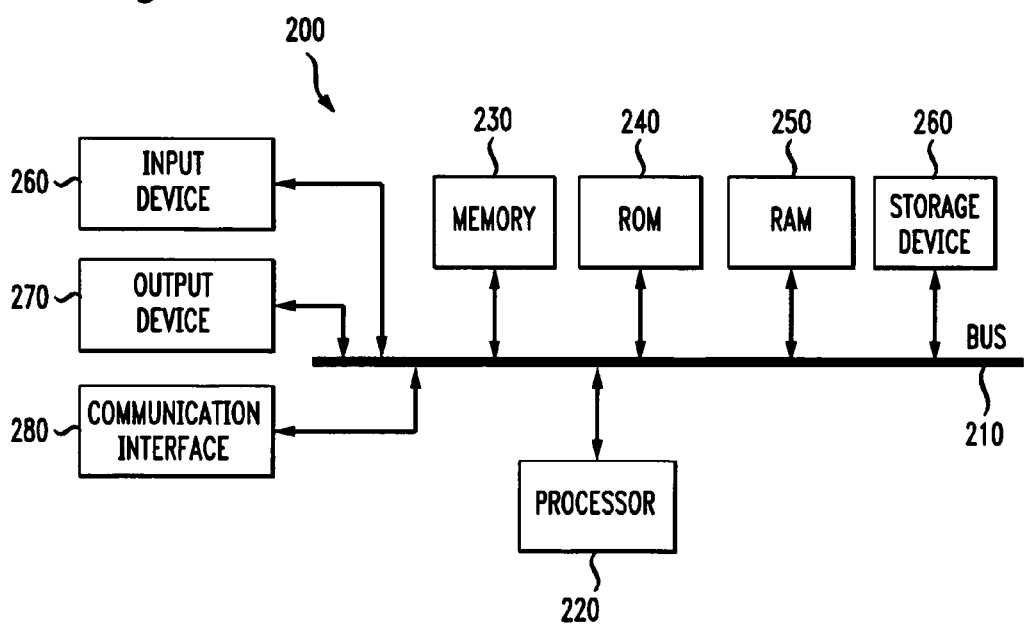
FIG. 2 illustrates a system embodiment of the invention.

With reference to FIG. 2, an exemplary system for implementing the invention includes a general purpose computing device 200, including a processing unit (CPU) 220, a system memory 230, and a system bus 210 that couples various system components including the system memory 230 to the processing unit 220. It can be appreciated that the invention may operate on a computing device with more than one CPU 220 or on a group or cluster of computing devices networked together to provide greater processing capability. The system bus 210 may be any of several types of bus structures including a memory bus or memory controller, a peripheral bus, and a local bus using any of a variety of bus architectures. The system may also include other memory such as read only memory (ROM) 240 and random access memory (RAM) 250. A basic input/output (BIOS), containing the basic routine that helps to transfer information between elements within the computing device 200, such as during start-up, is typically stored in ROM 240. The computing device 200 further includes storage means such as a hard disk drive 260, a magnetic disk drive, an optical disk drive, tape drive or the like. The storage device 260 is connected to the system bus 210 by a drive interface. The drives and the associated computer-readable media provide nonvolatile storage of computer readable instructions, data structures, program modules and other data for the computing device 200. The basic components are known to those of skill in the art and appropriate variations are contemplated depending on the type of device, such as whether the device is a small, handheld computing device, a desktop computer or a computer server.

Although the exemplary environment described herein employs the hard disk, it should be appreciated by those skilled in the art that other types of computer readable media which can store data that is accessible by a computer, such as magnetic cassettes, flash memory cards, digital video disks, cartridges, random access memories (RAMs), read only memory (ROM), a cable or wireless signal containing a bitstream and the like, may also be used in the exemplary operating environment.

To enable user interaction with the computing device 200, an input device 260 represents any number of input mechanisms, such as a microphone for speech, a touch-sensitive screen for gesture or graphical input, keyboard, mouse and so forth. The device output 270 can also be one or more of a number of output means. For example, speech output via a speaker, visual output through a graphical display. In some instances, multi-modal systems enable a user to provide multiple types of input to communicate with the computing device 200. The communications interface 280 generally governs and manages the user input and system output.

The present inventors have studied the affective component of human-machine communication. In typical spoken dialog systems, the affective component dimension is usually ignored although it plays a major role in engaging users in communicating with machines. Past research in the prediction of human emotion in spoken language has tended to exploit only isolated speech utterances (whether they are acted or spontaneous), using little or no contextual information. The present invention utilizes the dynamic nature of emotion as it is manifested in human-machine spoken communication. The traditional emotion indicators, such as prosody and language, are augmented with contextual information. Contextual information may comprise temporal variations of emotion indicators inter- and intra-utterance.

Using the principles of the invention, the inventors have observed an improvement in the prediction of negative user state using dialog acts over lexical and prosodic information alone and a further improvement using additional innovative contextual features. Overall performance accuracy using all features is around 80%.

Next is described an aspect of the invention related to feature modeling. Features are extracted from the corpus. Three conceptually different sets of features are described: baseline, state-of the art and contextual. All acoustic features were extracted using methods known in the art such as, for example, the method taught in P. Boersma, "Praat, a system for doing phonetics by computer," *Glot International*, vol. 5, no. 9/10, pp. 341-345, 2001, incorporated herein by reference.

The baseline feature set comprises lexical features (n-grams) as well as at least the following prosodic features extracted from the current user utterance: (1) Pitch: overall minimum, maximum, median, standard deviation; mean absolute slope; slope of final voiced section; mean over longest vowel; (2) Energy: overall minimum, maximum, mean, standard deviation; mean over longest vowel; (3) Speaking Rate: vowels-per-second, mean vowel length, ration of voiced frames to total frames, percent of internal silence (hesitation); and (4) Other: local jitter over longest vowel. Other lexical feature may also be associated with the baseline feature set.

Certain prosodic features utilized automatic segmentation in order to isolate vowels in the utterance. One aspect of the invention involves aligning the speech utterance with the reference transcriptions. This information was used for some speaking rate measurements as well as locating the longest normalized vowel in the utterance. Furthermore, all prosodic features are preferably normalized by gender using standard normalization whose values were represented as z-scores.

The state-of-the-art features set builds upon the baseline set by adding dialog acts, such as, for example: greeting, re-prompt, confirmation, specification, acknowledgment, disambiguation, informative. Other dialog acts are also contemplated as part of the invention as well.

Finally, a second dimension to the feature space is introduced as shown in Table 1, which is a representation of feature set space in two dimensions. Columns represent the conceptual feature types and rows represent the context these features types are defined by—such as the current utterance alone or in relation to past utterances. Capital letters indicate to which concept group each feature set belongs: the baseline system (B), the state-of-the-art system (S), or the contextual System (C).

TABLE 1

| Context | Feature Set | | |
|---|---|---|---|
| | Prosodic | Lexical | Discourse |
| $turn_i$ | B  S  C | B  S  C | —S  C |
| $turn_{i-1}\ turn_i$ | —  C | —  C | —S  C |
| $turn_{i-2}\ turn_i$ | —  C | —  C | —  C |
| ... | ... | ... | ... |

The contextual feature set uses information about the history of the dialog instead of simply the current utterance. Contextual features are realized differendy depending on the type of non-contextual feature from which they are derived. Several example statistical analyses are mentioned. Others may be used as well.

Calculations based on differential statistics are calculations used for continuous-valued features and as such represent the rate of change of prosodic values such as mean pitch from one turn to another. Preferably, both first and second order differences are considered. Joint Statistics may also be used. For discrete-valued features, such as dialog acts, contextual features are calculated by examining the joint information with the previous N values for that feature. In this way, dialog history was exploited, enabling the detection of changes in each speaker's feature values. These contextual features are supposed to model the speaker-dependent dimension. While joint statistic can be calculated up to any length, one aspect of the invention involves restricting the history length to some degree. For example, the history length may be restricted to N=2 because dialogs in the corpus average only 3.5 user utterances in length (see Table 2). Distance statistics may also be used. This information is used for lexical features. A distance, such as the Levenshtein edit distance, is calculated between the current utterance transcription and previous utterance transcriptions as a way to approximate the similarity between the content of two user utterances. The distance is normalized by the utterance length. Those of skill in the art will understand the Levenshtein edit distance.

Example research tools for testing and generating the present invention may include human-machine natural language dialogs from AT&T's "How May I Help You$^{SM}$" (HMIHY) corpus annotated with "voice signature" information. See I. Shafran, M. Riley, and M. Mohri, "Voice signatures," in *Proceedings of the $8^{th}$ IEEE Automatic Speech Recognition and Understanding Workshop (ASRU* 2003), St. Thomas, U.S. Virgin Islands, November 2003, incorporated herein by reference. The HMIHY corpus consists of data from a deployed customer care system. Voice signature information is considered the caller's age, gender, accent type, and emotional state in a given turn. The following represents an example dialog from the corpus:

System: How may I help you?
User: I need to find out about a number that I don't recognize.
System: Would you like to look up a number you don't recognize on your bill?
User: Yes I would.
System: Are you calling from your home phone?
User: Yes I am.
System: . . .

The HMIHY corpus is divided into a training and testing corpus based on temporal information—the training dialogs occur at dates previous to the dialogs in the testing corpus. This was designed to simulate real life system development and evaluation. No dialogs are split between training and testing sets. Table 2 lists some corpus statistics, such as the size of the training and testing sets in terms of user turns as well as the average number of user turns per dialog and words per utterance. The statistics from the HMIHY corpus were augmented with voice signature information, including user state (emotion).

TABLE 2

| Statistics | Training | Testing |
|---|---|---|
| number of dialogs | 4,259 | 1.431 |
| number of user turns | 15,013 | 5,000 |
| number of turns per dialog | 3.5 | 3.5 |
| number of words per turn | 9.0 | 9.9 |

Table 3 displays some of the most significant lexical correlations in the HMIHY corpus. This information is presented as an indication of the type of interactions in the corpus as well as to motivate the use of lexical features in the prediction of user state. Some of the more interesting correlations are words that indicate that a caller is speaking about their bill ("dollars", "cents", "call") and those that indicate that the caller wished to be transferred to a human operator ("person", "human", "speak", "talking", "machine"). Also, Table 3 shows that some filled pauses such as "oh" and non-speech human noises such as sign ([.brth]) are also correlated with negative user state. Table 3 shows a ranked list of significant correlations (p<0.001) between negative user state and lexical items and filled pauses).

TABLE 3

| Lexical Item | Correlation |
| --- | --- |
| me | 0.146 |
| don't | 0.139 |
| person | 0.127 |
| yes | −0.120 |
| not | 0.109 |
| talk | 0.101 |
| why | 0.097 |
| speak | 0.091 |
| talking | 0.085 |
| human | 0.083 |
| dollars | 0.080 |
| cents | 0.079 |
| call | 0.079 |
| [oh] | 0.037 |
| [.brth] | 0.035 |

The present inventors ran experiments to evaluate the effect of contextual features on the performance accuracy of predicting negative user state. Each user utterance in the HMIHY corpus was labeled with the following emotion labels: somewhat frustrated, very frustrated, somewhat angry, very angry, somewhat other negative, very other negative, positive/neutral. It is well appreciated that other emotional labels may be used as well. However, due to the non-uniform distribution of the emotion labels, as shown in Table 4, the inventors adopted a binary classification scheme. The positive/neutral label was re-labeled as non-negative and all remaining labels were collapsed to negative. 73.1% of all utterances in the test set are labeled as non-negative. This percentage is different from the 82.8% in Table 4 which accounts for the combined training and test sets. Table 4 shows the percentage of HMIHY corpus labeled with each of the original 7 emotion states.

TABLE 4

| Label | Percentage |
| --- | --- |
| positive/neutral | 82.8% |
| somewhat frustrated | 12.0% |
| somewhat angry | 3.9% |
| somewhat other negative | 0.9% |
| very frustrated | 0.2% |
| very angry | 0.2% |
| very other negative | 0.1% |

It is preferable to use Boostexter, a known boosting algorithm utilizing weak learners, for automatic classification. See, e.g., R. E. Schapire and Y. Singer, "Boostexter: A boosting-based system for text categorization," *Machine Learning*, vol. 39, no. 2/3, pp. 135-168, 2000, incorporated herein by reference. Features values were both continuous and discrete (e.g. word n-grams). All performance accuracies are reported after 2,000 iterations.

Classification experiments were run for each of the conceptual feature sets presented above. Table 5 compares the performance accuracy of each feature set. The chance performance is the result of always guessing non-negative user state. The baseline system consisting of prosodic and lexical information of the current utterance performs better than chance and the more discourse and contextual information (dialog acts in the case of the state-of-the-art feature set and prior statistics, differentials, and edit distance in the case of contextual feature set), the more prediction accuracy of negative user state increases. Table 5 shows the performance accuracy summary by feature set for the chance, baseline, state-of-the-art and the contextual system. For the latter three systems feature sets are additively augmented.

TABLE 5

| Feature Set | Accuracy | Relative Improvement over Baseline |
| --- | --- | --- |
| Chance | 73.1% | NA |
| Baseline | 76.1% | NA |
| State-of-the-Art | 77.0% | 1.2% |
| Contextual | 79.0% | 3.8% |

There is a need for using more contextual information in the prediction of negative user state in real life human-machine dialog. A baseline system has been re-created consisting of prosodic and lexical features extracted from the current utterance and demonstrated that such information is useful in the prediction of user state insomuch as such a system outperforms chance. An aspect of the invention involves augmenting in the form of dialog acts. The relative classification improvement of this state-of-the-art system over the baseline system is on par with the results presented in the literature.

Most importantly, though, the invention shows how the idea of using dialog history can be expanded beyond dialog acts to encompass both prior statistics of discourse information as well as differential information of prosodic features. With such contextual information, the inventors observed even larger performance gains. These results show that using ever more informed context-dependent information will only continue to increase the accuracy of emotion detection in human-machine dialog systems and will be a necessary component of a computational model of human emotion. With the above description in mind, FIG. 3 illustrates an example of some basic steps of the invention. A dialog system receives an utterance from a user in a natural language dialog between the user and a computing device (302). The system receives contextual information regarding the natural language dialog (304) and detects an emotion of the user based at least in part on the received contextual information (306). The contextual information may relate to such features as dialog acts in the natural language dialog, differential statistics (such as, for example, statistics related to a rate of change of prosodic values from one turn to another in the natural language dialog), joint statistic (such as, for example, statistics related to examining a discrete-value feature in the current utterance with reference to at least one previous value for that feature), distance statistics, and so forth. The joint statistic discrete-value feature may be one of a dialog act, a number of dialogs, a number of user turns a number of words per turn. Other data may be utilized in the contextual information such as temperature of the room or perceived temperature of the user, audio levels (is the user yelling), and so forth. Detecting the emotion may be further based on prosodic and lexical features extracted from the received utterance. The distance statistics may relate to similarities in lexical features between the current utterances and at least one previous utterance. As can be appreciated, a variety of data may be utilized and processed to detect emotion in a spoken dialog.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

The invention claimed is:

1. A method for emotion detection during a natural language dialog between a user and a computing device, the method comprising:
receiving an utterance from the user as part of the natural language dialog between the user and the computing device;
identifying, based on the utterance, an identified group comprising one of a social group, an ethnic group and a geographic group, the identified group having separate identifiable concepts of an individual emotion;
receiving non-repetitive dialog acts in the natural-language dialog, wherein the non-repetitive dialog acts are prompts by the computing device; and
detecting, via the computing device, an emotion of the user based on the identified group and at least in part on the non-repetitive dialog acts.

2. The method of claim 1, wherein the non-repetitive dialog acts comprise at least one of: greeting, re-prompt, specification, acknowledgement, and informative.

3. The method of claim 2, wherein detecting the emotion of the user further is based on prosodic and lexical features extracted from the received utterance.

4. The method of claim 1, further comprising receiving contextual information used for detecting the emotion of the user, the context of information comprising one of differential statistics, joint statistics, distance statistics, and statistics collected during a prior dialog between the user and the computing device including (1) differential information of prosodic features, (2) temporal variation of emotion indicators inter-utterance, and (3) temporal variation of emotion indicators intra-utterance.

5. The method of claim 4, wherein differential statistics relate to a rate of change of prosodic values from one turn to another in the natural language dialog.

6. The method of claim 4, wherein the joint statistics relate to examining a discrete-value feature in the current utterance with reference to at least one previous value for the discrete-value feature.

7. The method of claim 6, wherein the discrete-value feature is one of a dialog act, a number of dialogs, a number of user turns, and a number of words per turn.

8. The method of claim 4, wherein the distance statistics relate to similarities in lexical features between the current utterances and at least one previous utterance.

9. A non-transitory computer-readable medium, storing instructions for controlling a computing device to detect emotion during a natural language dialog between a user and the computing device, the instructions comprising:
receiving an utterance from the user in a human-computing device natural language dialog;
identifying, based on the utterance, an identified group comprising one of a social group, an ethnic group and a geographic group, the identified group having separate identifiable concepts of an individual emotion;
receiving non-repetitive dialog acts in the natural-language dialog, wherein the non-repetitive dialog acts are prompts by the computing device; and
detecting an emotion of the user based on the identified group and at least in part on the non-repetitive dialog acts.

10. The non-transitory computer-readable medium of claim 9, wherein the non-repetitive dialog acts comprise at least one of: greeting, re-prompt, specification, acknowledgement, and informative.

11. The non-transitory computer-readable medium of claim 10, wherein detecting the emotion of the user further is based on prosodic and lexical features extracted from the received utterance.

12. The non-transitory computer-readable medium of claim 9, further comprising receiving contextual information used for detecting the emotion of the user, the contextual information comprising at least one of differential statistics, joint statistics, distance statistics, and statistics collected during a prior dialog between the human and the computing device including (1) differential information of prosodic features, (2) temporal variation of emotion indicators inter-utterance, and (3) temporal variation of emotion indicators intra-utterance.

13. The non-transitory computer-readable medium of claim 12, wherein differential statistics relate to a rate of change of prosodic values from one turn to another in the natural language dialog.

14. The non-transitory computer-readable medium of claim 13, wherein the joint statistics relate to examining a discrete-value feature in the current utterance with reference to at least one previous value for the discrete-value feature.

15. The non-transitory computer-readable medium of claim 14, wherein the discrete-value feature is one of a dialog act, a number of dialogs, a number of user turns, and a number of words per turn.

16. The non-transitory computer-readable medium of claim 12, wherein the distance statistics relate to similarities in lexical features between the current utterances and at least one previous utterance.

17. A computing device that detects emotion during a natural language dialog between a user and the computing device, the computing device comprising:
 a first module configured to receive an utterance from a user in a human-computing device natural language dialog;
 a second module configured to identify, based on the utterance, an identified group comprising one of a social group, an ethnic group and a geographic group, the identified group having separate identifiable concepts of an individual emotion;
 a third module configured to receive non-repetitive dialog acts in the natural language dialog, wherein the non-repetitive dialog acts are prompts by the computing device; and
 a fourth module configured to detect an emotion of the user based on the identified group and at least in part on the non-repetitive dialog acts.

18. The computing device of claim 17, wherein the non-repetitive dialog acts comprise at least one of: greeting, re-prompt, specification, acknowledgement, and informative.

19. The computing device of claim 18, wherein the fourth module is further configured to detect the emotion of the user based on prosodic and lexical features extracted from the received utterance.

20. The computing device of claim 17, wherein the third module is further configured to receive contextual information used for detecting the emotion of the user, the contextual information comprising at least one of differential statistics, joint statistics, distance statistics, and statistics collected during a prior dialog between the human and the computing device including (1) differential information of prosodic features, (2) temporal variation of emotion indicators inter-utterance, and (3) temporal variation of emotion indicators intra-utterance.

* * * * *